US007949586B2

(12) United States Patent  (10) Patent No.: US 7,949,586 B2
Shalen  (45) Date of Patent: May 24, 2011

(54) METHOD AND SYSTEM FOR CREATING AND TRADING DERIVATIVE INVESTMENT INSTRUMENTS BASED ON AN INDEX OF COLLATERALIZED OPTIONS

(75) Inventor: Catherine T. Shalen, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 543 days.

(21) Appl. No.: 12/020,809

(22) Filed: Jan. 28, 2008

(65) Prior Publication Data

US 2008/0183640 A1    Jul. 31, 2008

Related U.S. Application Data

(60) Provisional application No. 60/887,294, filed on Jan. 30, 2007.

(51) Int. Cl.
    *G06Q 40/00*  (2006.01)
(52) U.S. Cl. ............................................. 705/35; 705/28
(58) Field of Classification Search ...................... 705/35
    See application file for complete search history.

(56) References Cited

U.S. PATENT DOCUMENTS

| | | | |
|---|---|---|---|
| 2004/0111358 A1* | 6/2004 | Lange et al. | 705/37 |
| 2006/0253354 A1 | 11/2006 | O'Callahan | |
| 2006/0253355 A1 | 11/2006 | Shalen | |
| 2006/0253359 A1 | 11/2006 | O'Callahan et al. | |
| 2006/0253367 A1* | 11/2006 | O'Callahan et al. | 705/37 |
| 2006/0253368 A1 | 11/2006 | O'Callahan et al. | |
| 2006/0253369 A1 | 11/2006 | O'Callahan | |
| 2006/0253370 A1 | 11/2006 | Feuser et al. | |

OTHER PUBLICATIONS

Business Wire (Apr. 10, 2000) American Stock Exchange LLC List Options BAsed on Morgan Stanley Internet Index, AMEX:MOX.*
Demeterfi, Kresimir, et al., "More Than You Ever Wanted to Know About Volatility Swaps," Goldman Sachs Quantitative Strategies Research Notes, Mar. 1999.
CBOE Futures Exchange letter dated May 17, 2004, to Commodity Futures Trading Commission with accompanying pages containing rules, terms, and conditions for a new product to be traded on the CBOE Futures Exchange, 8 pages.
Press Release article, "CBOE Announces Launch of Futures on VIX: First Tradable Volatility Product Will be Offered on New CBOE Futures Exchange," Sep. 5, 2003, two pages.

* cited by examiner

*Primary Examiner* — Ella Colbert
*Assistant Examiner* — John A Anderson
(74) *Attorney, Agent, or Firm* — Brinks Hofer Gilson & Lione

(57) ABSTRACT

Collateralized option index derivative investment instruments and methods for creating a collateralized option index are disclosed herein based on changes in a performance of collateralized option strategies. According to an aspect of the disclosure, a method for calculating a collateralized option index is disclosed. In one embodiment, the method for calculating a collateralized option index includes calculating a value of a portfolio invested in a collateralized short strategy according to the relation:

$$V_t = M_t - N_{last} P_t$$

where $M_t$ is a value of a LIBOR component of the portfolio at the close of date t, $N_{last}$ is a number of put options sold at a last roll date, and $P_t$ is a price of the underlying option portfolio based on arithmetic averages of the last bid and ask prices of all options in the underlying option portfolio reported before a time on date t.

24 Claims, 3 Drawing Sheets

COLLATERALIZED PUT INDEX

METHOD AND SYSTEM FOR CREATING AND TRADING DERIVATIVE INVESTMENT INSTRUMENTS BASED ON AN INDEX OF COLLATERALIZED OPTIONS

CROSS-REFERENCE TO RELATED APPLICATIONS

This application claims the benefit of U.S. application Ser. No. 60/887,294, filed Jan. 30, 2007, pending, the entirety of which is hereby incorporated by reference herein.

TECHNICAL FIELD

The present invention relates generally to financial trading systems and more particularly to the creation, identification, processing, trading, quotation, and valuation of collateralized options indices and related derivative investment instruments.

BACKGROUND

An index is a statistical composite that is used to indicate the performance of a market or a market sector over various time periods. Examples of indices that are used to gauge the performance of stocks and other securities in the United States include the Dow Jones® Industrial Average, the National Association of Securities Dealers Automated Quotations (NASDAQ®) Composite Index, the New York Stock Exchange® Composite Index, etc. In general, the Dow Jones® Industrial Average contains thirty (30) stocks that trade on the New York Stock Exchanges and is a general indicator of how shares of the largest United States companies are trading. The NASDAQ® Composite Index is a composite index of more than three thousand (3,000) companies listed on the NASDAQ® (also referred to as over-the-counter or OTC stocks). It is designed to indicate the stock performance of small-cap and technology stocks. Finally, the New York Stock Exchange® Composite Index is a composite index of shares listed on the New York Stock Exchange®.

In equal-dollar weighted indices, the weights of each component are reset to equal values at regular intervals, such as for example, every quarter. Between re-adjustments, the weights of the various index components will deviate from the equal-dollar weighting values as the values of the components fluctuate. Periodically, indices must be adjusted in order to reflect changes in the component companies comprising the index, or to maintain the original intent of the index in view of changing conditions in the market. For example, if a component stock's weight drops below an arbitrary threshold, or if a component company significantly alters its line of business or is taken over by another company so that it no longer represents the type of company which the index is intended to track, the index may no longer be influenced by, or reflect the aspects of the market for which it was originally designed. In such cases it may be necessary to replace a component stock with a suitable replacement stock. If a suitable replacement that preserves the basic character of the index cannot be found, the stock may simply be dropped without adding a replacement. Conversely, activity in the market for which an index is created may dictate that a new stock (which was not originally included in the index) having a strong impact in the market be added to the index to adequately reflect the market without eliminating other components. In each case, the divisor may be adjusted so that the index remains at the same level immediately after the new stock is added or the old stock is eliminated.

Derivatives are financial securities whose values are derived in part from a value or characteristic of some other underlying asset or variable (the underlying asset). The underlying asset may include securities such as stocks, market indicators and indices, interest rate, and corporate debt, such as bonds, to name but a few. Two common forms of derivatives are options contracts and futures contracts, discussed herein below.

An option is a contract giving the holder of the option the right, but not the obligation, to buy or sell an underlying asset at a specific price on or before a certain date. Generally, a party who purchases an option is said to have taken a long position with respect to the option. The party who sells the option is said to have taken a short position. There are generally two types of options: calls and puts. An investor who has taken a long position in a call option has bought the right to purchase the underlying asset at a specific price, known as the "strike price." If the long investor chooses to exercise the call option, the long investor pays the strike price to the short investor, and the short investor is obligated to deliver the underlying asset.

Alternatively, an investor who has taken a long position in a put option receives the right, but not the obligation to sell the underlying asset at a specified price, again referred to as the strike price on or before a specified date. If the long investor chooses to exercise the put option, the short investor is obligated to purchase the underlying asset from the long investor at the agreed upon strike price. The long investor must then deliver the underlying asset to the short investor. Thus, the traditional settlement process for option contracts involves the transfer of funds from the purchaser of the underlying asset to the seller, and the transfer of the underlying asset from the seller of the underlying asset to the purchaser. Cash settlement, however, is more common. Cash settlement allows options contracts to be settled without actually transferring the underlying asset.

A call option is "in-the-money" when the price or value of the underlying asset rises above the strike price of the option. A put option is "in-the-money" when the price or value of the underlying asset falls below the strike price of the option. An at-the-money option wherein the price or value of the underlying asset is equal to the strike price of the option. A call option is out-of-the-money when the price or value of the underlying asset is below the strike price. A put option is out-of-the-money when the price or value of the underlying asset is above the strike price. If an option expires at-the-money or out-of-the-money, it has no value. The short investor retains the amount paid by the long investor (the option price) and pays nothing to the long investor. Cash settlement of an in-the-money option, be it a call or a put, however, requires the short investor to pay to the long investor the difference between the strike price and the current market value of the underlying asset.

Cash settlement allows options to be based on more abstract underlying "assets" such as market indicators, stock indices, interest rates, futures contracts and other derivatives. For example, an investor may take a long position in a market index call option. In this case, the long investor receives the right to "purchase" not the index itself, but rather a cash amount equal to the value of the index (typically multiplied by a multiplier) at a specified strike value. An index call option is in-the-money when the value of the index rises above the strike value. When the holder of an in-the-money index call option exercises the option, the short investor on the opposite side of the contract is obligated to pay the long investor the difference between the current value of the index and the strike price, usually multiplied by the multiplier. If the current value of the index is less than or equal to the strike value, the option has no value. An index put option works in the same way but in reverse, having value, or being in-the-money when the value of the index falls below the strike value.

Futures contracts are another common derivative security. In a futures contract a buyer purchases the right to receive delivery of an underlying commodity or asset on a specified date in the future. Conversely, a seller agrees to deliver the commodity or asset to an agreed location on the specified date. Futures contracts originally developed in the trade of agricultural commodities, but quickly spread to other commodities as well. Because futures contracts establish a price for the underlying commodity in advance of the date on which the commodity must be delivered, subsequent changes in the price of the underlying asset will inure to the benefit of one party and to the detriment of the other. If the price rises above the futures price, the seller is obligated to deliver the commodity at the lower agreed upon price. The buyer may then resell the received product at the higher market price to realize a profit. The seller in effect loses the difference between the futures contract price and the market price on the date the goods are delivered. Conversely if the price of the underlying commodity falls below the futures price, the seller can obtain the commodity at the lower market price for delivery to the buyer while retaining the higher futures price. In this case the seller realizes a profit in the amount of the difference between the current market price on the delivery date and the futures contract price. The buyer sees an equivalent loss.

Like options contracts, futures contracts may be settled in cash. Rather than actually delivering the underlying asset, cash settlement merely requires payment of the difference between the market price of the underlying commodity or asset on the delivery date and the futures contract price. The difference between the market price and the futures price is to be paid by the short investor to the long investor, or by the long investor to the short investor, depending on which direction the market price has moved. If the prevailing market price is higher than the contract price, the short investor must pay the difference to the long investor. If the market price has fallen, the long investor must pay the difference to the short investor.

Again, like options, cash settlement allows futures contracts to be written against more abstract underlying "assets" or "commodities," such as market indicators, stock indices, interest rates, futures contracts and other derivatives. For example, an investor may take a long position in a market index futures contract. In this case, the long investor "buys" the index at a specified futures price (i.e. a future value of the index on the "delivery" date). The index based futures contract is cash settled. One party to the contract pays the difference between the futures price and the actual value of the index (often multiplied by a specified multiplier) to the other investor depending on which direction the market has moved. If the value of the index has moved above the futures price, or futures value, the short investor pays the difference the long investor. If the value of the index has moved below the futures price, or futures value the long investor pays the difference to the short investor.

Cash settlement provides great flexibility regarding the types of underlying assets that derivative investment instruments may be built around. Essentially any variable whose value is subject to change over time, may serve as the underlying asset for a derivative investment instrument. While standard derivatives may be based on many different underlying assets, no index or derivative investment instruments based thereon exist that capture changes in the performance of collateralized option strategies.

BRIEF SUMMARY

In order to address the need for improvements on derivative investment instruments, collateralized option index derivative investment instruments and methods for creating a collateralized option index are disclosed herein based on changes in the performance of collateralized option strategies.

According to a first aspect of the disclosure, a method for calculating a collateralized option index is disclosed. The method may include calculating a collateralized option index may include calculating a value of a portfolio invested in a collateralized short strategy according to the relation:

$$V_t = M_t - N_{old} P_t$$

and transmitting the calculated value to market participants over a communication network, where $M_t$ is a value of a LIBOR component of the portfolio at the close of date t, $N_{old}$ is a number of put options sold at a last roll date, and $P_t$ is a price of the underlying option portfolio based on arithmetic averages of the last bid and ask prices of all options in the portfolio reported before a time on date t.

According to another aspect of the disclosure, a method for calculating a collateralized option index is disclosed. The method may include calculating a collateralized option index may include calculating a value of a portfolio invested in a collateralized short put strategy according to the relation:

$$V_t = M_t - N_{old} P_t$$

and transmitting the calculated value to market participants over a communication network, where $M_t$ is the value of a money market component of the portfolio at the close of date t, $N_{old}$ is a number of put options sold at a previous roll date, and $P_t$ is the arithmetic average of the last bid and ask prices of the put option reported before a time on date t.

In another aspect, a method of calculating a collateralized option index may include calculating a value of a portfolio invested in a collateralized short strategy according to a relation:

$$V_t = M_t - N_{last} P_t$$

where $M_t$ is a value of a money market component of the portfolio at a close of date t, $N_{last}$ is a number of bear spreads sold at a previous roll date, and $P_t$ is a value of the bear spread at a close, equal to a difference between arithmetic averages of last bid and ask prices of at-the-money and out-of-the-money put options reported before a time on date t, and transmitting the calculated value to market participants over a communication network.

In other aspects of the invention a computer readable medium containing processor executable instructions for carrying out the above-described methods is disclosed.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
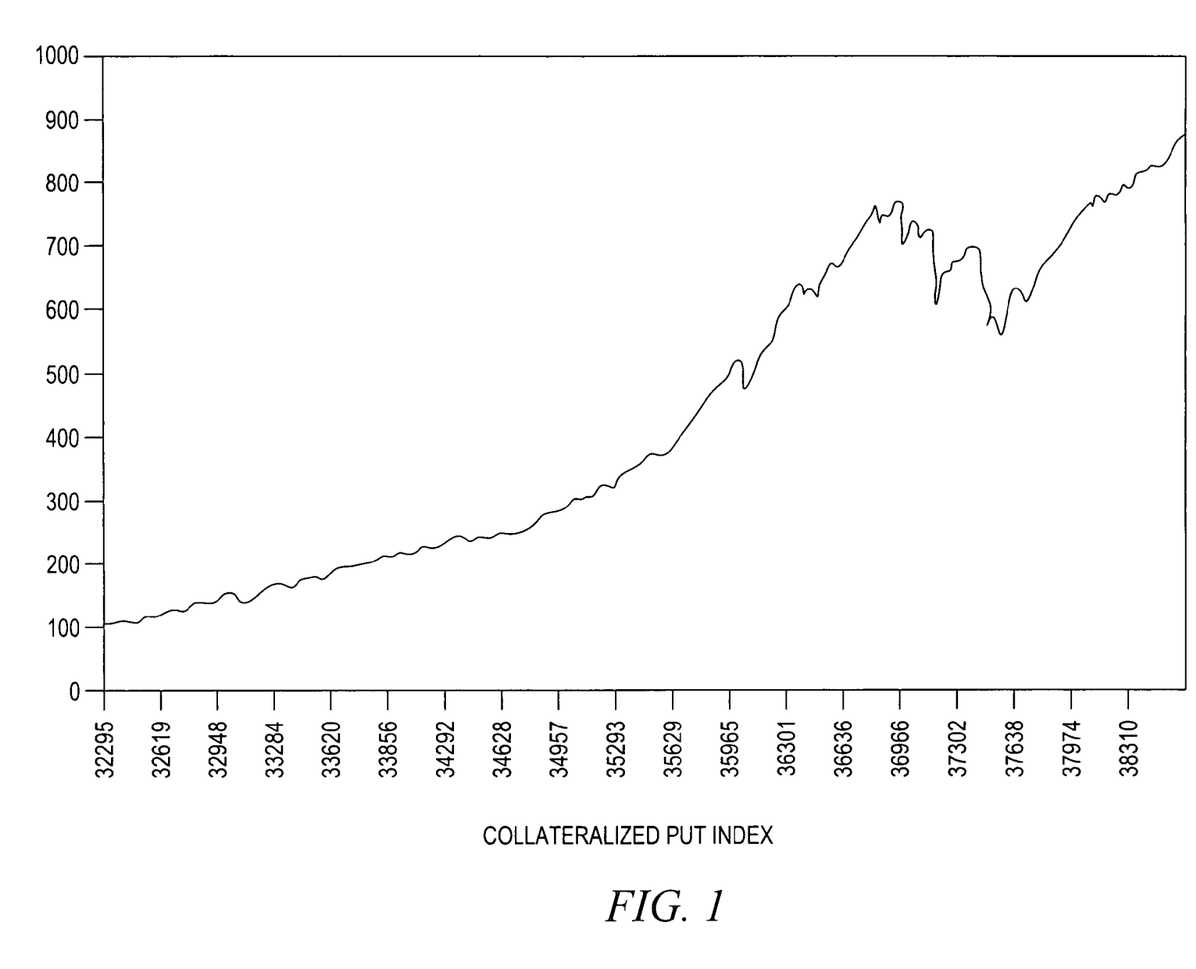
FIG. 1 is a graph illustrating one embodiment of an example collateralized option index that calculates a value of a portfolio invested in a collateralized short strategy.

Referring now to FIG. 1, an index is illustrated that was designed to reflect a portfolio that invests in Standard & Poor'® 500 index stocks that also sells S&P 500® index put options (ticker symbol "SPX"). The S&P 500® index is disseminated by Standard & Poor's, 55 Water Street, New York, N.Y. 10041 ("S&P"). S&P 500® index options are offered by the Chicago Board Options Exchange®, 400 South LaSalle Street, Chicago, Ill. 60605 ("CBOE"). In an alternative embodiment, an index could be designed to reflect a portfolio that invests in Dow Jones Industrials Average index stocks that also sells Dow Jones Industrials Average index put options (DJX). The Dow Jones Industrials Average index is disseminated by Dow Jones & Company Dow Jones Indexes, P.O. Box 300, Princeton, N.J. 08543-0300. Dow Jones Industrials Average index options are offered by the Chicago Board Options Exchange (CBOE). In further alternative embodiments, indices could be designed to reflect a portfolio that invests in NASDAQ-100 (NDX) stocks or any other equity index that also sells NASDAQ or any other equity index put options.

In some embodiments, an exchange traded fund could be designed to reflect the financial instruments that establish benchmark indices against which a particular portfolio manager's performance can be measured. In one embodiment, an exchange traded fund could be designed to reflect a portfolio that invests in Standard & Poor's® 500 index stocks that also sells S&P 5000 index put options (SPX). In another embodiment, an exchange traded fund could be designed to reflect a portfolio that invests in Dow Jones Industrials Average index stocks that also sells Dow Jones Industrials Average index put options (DJX).

Present collateralized option indexes ("CBOE Collateralized SPX Option Indexes") are designed to measure the performance of hypothetical collateralized SPX option strategies. Each index tracks the value of a passive portfolio composed of (1) a money market account invested at the one-month London interbank offered rate (hereinafter "LIBOR") and (2) S&P 500 options or combination of options with limited downside risk, e.g. a short position in one-month S&P 500 puts, short bear or bull spreads and short straddles or strangles combined with a long call and put respectively. The money market and option positions are rolled monthly at the expiration of CBOE S&P 500 options, usually on the third Friday of each month. The options are collateralized in the sense that the number of option positions sold at each roll is set to ensure that the value of the portfolio will be non-negative at the next expiration. The LIBOR referenced above is a daily reference based on interest rates at which banks offer to loan unsecured funds to other banks in the London wholesale money market (or interbank market). LIBOR rates are widely used as a reference for financial instruments, such as derivatives contracts and the like. LIBOR is published daily by the British Bankers Association (BBA). The bear spread referenced above is, in options trading, a vertical spread options strategy that can be used when a trader is pessimistic on the direction of value of an underlying security. A bear spread is constructed by buying higher striking in-the-money put options and selling the same number of lower striking out-of-the-money put options on the same underlying security in the same expiration month with the desire that the price of the underlying security drops so that the trader will net the difference between the strike prices and the cost of entering the position.

Example Index Methodologies

In one embodiment, the index ("CBOE S&P 500 PutWrite Index") tracks the value of an initial investment of $100 in a portfolio that passively follows the CBOE S&P 500 Collateralized Put Strategy. The portfolio is managed and calculated as follows:

On Jun. 1, 1988, the inception date, S&P 500 July 1988 at-the-money put options are sold. The proceeds from the sale of the puts plus $100 are invested at the one-month LIBOR. The number of put options sold is chosen to ensure full collateralization. This means that at the expiration of the put options, the value of the LIBOR investment must be equal to the maximum possible loss from final settlement of the put options, or N*K where N is the number of puts sold and K is the at-the-money strike price. After each expiration and final settlement, new at-the-money put options expiring in the next month are sold, and the proceeds from this sale plus the post-settlement value of the LIBOR account are invested at the one-month LIBOR. It can be assumed that the intraday cash flows from the final settlement of the options to the SOQ at the open and the subsequent sale of new puts are invested at the close of the roll date.

Final Settlement Price of Expiring Put Options

At expiration, the put options are settled to a Special Opening Quotation (or SOQ, ticker "SET") of the S&P 500. If expiration falls on an exchange holiday, the put option will be settled against the SOQ on the previous business day and the new put option will be selected on that day as well. The SOQ is a special calculation of the S&P 500 Index that is compiled from the opening prices of component stocks underlying the S&P 500 Index. The SOQ calculation is performed when all 500 stocks underlying the S&P 500 Index have opened for trading, and is usually determined before 11:00 a.m. ET. If one or more stocks in the S&P 500 Index do not open on the day the SOQ is calculated, the final settlement price for SPX options is determined in accordance with the Rules and By-Laws of the Options Clearing Corporation ("OCC"). The final settlement price of the expiring put option is the greater of 0 and the difference between its strike price and the SOQ.

Selection of the "At-the-Money" Strike Price

The strike price of the new options is the strike price of the listed CBOE S&P 500 Index put option that is closest to but not greater than the last value of the S&P 500 Index reported before 11:00 a.m. ET. For example, if the last S&P 500 Index value reported before 11:00 a.m. ET is 1233.10 and the closest listed S&P 500 Index put option strike price below 1233.10 is 1230 then 1230 strike S&P 500 Index put options are sold.

Sale Price of Put Options

The new put options are deemed sold at a price equal to the volume-weighted average of the traded prices ("VWAP") of put options with that strike during the half-hour period beginning at 11:30 a.m. ET. The CBOE calculates the VWAP in a two-step process: first, the CBOE excludes trades between 11:30 a.m. and 12:00 p.m. ET that are identified as having been executed as part of a "spread," and then the CBOE calculates the weighted average of all remaining transaction prices at that strike between 11:30 a.m. and 12:00 p.m. ET, with weights equal to the fraction of total non-spread volume transacted at each price during this period. The source of the transaction prices used in the calculation of the VWAP is CBOE's Market Data Retrieval ("MDR") System. Time and sales information from CBOE's MDR System is disseminated through the Options Price Reporting Authority (OPRA) and is publicly available through most price quote vendors. If no transactions occur at the new put strike between 11:30 a.m. and 12:00 p.m. ET, then the new put options are deemed sold at the last bid price reported before 12:00 p.m. ET.

EXAMPLE 1

Index Calculation

The CBOE S&P 500 PutWrite Index may be calculated by the CBOE once per day at the close of trading, but the CBOE S&P 500 PutWrite Index may be calculated more or less frequently. On any given date, the index represents the value of the portfolio invested in the CBOE S&P 500 PutWrite strategy since the inception date of the Index.

On all dates the value of the portfolio is equal to:

$$V_t = M_t - N_{old} P_t$$

where $M_t$ is the value of the LIBOR component of the portfolio at the close of date t, $N_{old}$ is the number of put options sold at the last roll date, and $P_t$ is the arithmetic average of last bid and ask prices of the put option reported before 4:00 p.m. ET on date t.

On all but roll dates, the value of the LIBOR account is equal to:

$$M_t = (1 + \rho_{t-1,t}) M_{t-1}$$

where $\rho_{t-1,t}$ is the effective LIBOR rate from date t−1 to date t.

On roll dates, cash outflow from the final settlement of the expiring options is debited from the LIBOR account and the proceeds from the sale of new put options is credited to the LIBOR account:

$$M_t = (1 + \rho_{t-1,t}) M_{t-1} - N_{old} \text{Max}[0, K_{old} - SOQ_t] + N_{new} P_{vwap}$$

In this expression, $K_{old}$ is the strike price of the put options sold at the previous roll date, $SOQ_t$ is the final settlement price of these options on roll date t, $N_{new}$ is the number of new puts sold and $P_{vwap}$ is the volume-weighted average price at which the new options are sold. The number $N_{new}$ of new puts sold on roll date t is determined as follows:

$$N_{new} = (M_{t-1}(1 + \rho_{t-1,t}) - N_{t-1} \max[0, K_{old} - SOQ_t]) / (K_{new}/(1+r) - P_{vwap})$$

where $K_{new}$ is the strike price at which the new puts are sold, and r is the effective LIBOR rate of return from this to the next roll date. Compounding the rate $\rho_{t-1,t}$ daily from roll date t to the next roll date yields the effective rate r.

In another embodiment, CBOE Collateralized Short S&P 500 Put Indexes measure the performance of an option strategy based on CBOE S&P 500 options. This strategy, called the "Collateralized Short Put Strategy," consists of holding a hypothetical portfolio of (1) a money market account invested at one-month LIBOR and (2) a sequence of short positions in one-month CBOE S&P 500 at-the money options-at-the-money strategy-or out-of the money options-out-of-the-money strategies-. The monthly process of settling the expiring options, selling new options and reinvesting the amount in the money market account at LIBOR is referred to as the "roll" and described in detail below.

One embodiment of a method used to calculate the CBOE Collateralized Short S&P 500 Put Indexes is described below. Other CBOE Collateralized indexes may be calculated in a similar manner. One difference is that instead of just selling puts at one strike, combinations of puts and calls at different strikes are rolled over monthly. Collateralized Option Indexes based on different stock indexes can be designed using the same methodologies.

CBOE Collateralized Short S&P 500 Put Indexes measure the performance of an option strategy based on CBOE S&P 500 options. This strategy, called the "Collateralized Short Put Strategy," consists of holding a hypothetical portfolio of (1) a money market account invested at one-month LIBOR and (2) a sequence of short positions in one-month CBOE S&P 500 at-the money options-at-the-money strategy-or out-of the money options-out-of-the-money strategies. The monthly process of settling the expiring options, selling new options and reinvesting the amount in the money market account at LIBOR is referred to as the "roll" and described in detail below.

Each Collateralized Short Put Index represents the value of an initial investment of $100 in the Collateralized Short Put strategy. On Jun. 1, 1988, the inception date of the index, $100 is invested at one-month LIBOR. Following this inception date, and starting on Jun. 17, 1988, one-month S&P 500 put options are sold at each S&P 500 option expiration date.

The put options are held to the next expiration, usually the $3^{rd}$ Friday of the month when they are settled to the Special Opening Quotation (or SOQ, ticker "SET") of the S&P 500. If expiration is an exchange holiday, the put option will be settled against the SOQ on the previous business day and the new put option will be selected on that day as well. The SOQ is a special calculation of the S&P 500 Index that is compiled from the opening prices of component stocks underlying the S&P 500 Index. The SOQ calculation is performed when all 500 stocks underlying the S&P 500 Index have opened for trading, and is usually determined before 11:00 a.m. ET. If one or more stocks in the S&P 500 Index do not open on the day the SOQ is calculated, the final settlement price for SPX options is determined in accordance with the Rules and By-Laws of the OCC. The final settlement price of the expiring put option is the greater of 0 and the difference between its strike price and the SOQ.

After the settlement of the expiring put options, new at-the-money or out-of the money put options expiring in the next month are sold. For the at-the-money strategy, the strike price of the new options is the strike price of the listed CBOE S&P 500 Index put option that is closest to but not greater than the last value of the S&P 500 Index reported before 11:00 a.m. ET. For example, if the last S&P 500 Index value reported before 11:00 a.m. ET is 1233.10 and the closest listed S&P 500 Index put option strike price below 1233.10 is 1230 then 1230 strike S&P 500 Index put options are sold. For a 5% out-of the-money strategy, if the 1170 strike put options were the closest listed strike below 1171.45, then 1170 strike put options would be sold.

Once the next strike price has been identified, new put options are deemed sold at a price equal to the volume-weighted average of the traded prices ("VWAP") of put options with that strike during the half-hour period beginning at 11:30 a.m. ET. The CBOE calculates the VWAP in a two-step process: first, the CBOE excludes trades between 11:30 a.m. and 12:00 p.m. ET that are identified as having been executed as part of a "spread," and then the CBOE calculates the weighted average of all remaining transaction prices at that strike between 11:30 a.m. and 12:00 p.m. ET, with weights equal to the fraction of total non-spread volume transacted at each price during this period. The source of the transaction prices used in the calculation of the VWAP is CBOE's Market Data Retrieval ("MDR") System. Time and sales information from CBOE's MDR System is disseminated through the Options Price Reporting Authority (OPRA) and is publicly available through most price quote vendors If no transactions occur at the new put strike between 11:30 a.m.

and 12:00 p.m. ET, then the new put options are deemed sold at the last bid price reported before 12:00 p.m. ET.

The number of put options sold collateralizes the portfolio; it is set such that the value of the money market account at the next roll date will equal the greatest potential loss from the final settlement of the expiring options. Last, the cash flows from the final settlement of expiring options and the sale of options are debited and credited respectively from and to the money market account, and the amount in the account is then reinvested at one-month LIBOR. It can be assumed that the intraday cash flows from the final settlement of the options to the SOQ at the open and the subsequent sale of new puts are invested at the close of the roll date.

EXAMPLE 2

Index Calculation

CBOE Collateralized Short S&P 500 Put Option Indexes may be calculated by the CBOE once per day at the close of trading (for the respective components of the collateralized short S&P 500 put portfolio), but CBOE Collateralized Short S&P 500 Put Option Indexes may also be calculated more or less frequently. On any given date, each index represents the value of the portfolio invested in the Collateralized Short S&P 500 strategy since the inception date of the Index.

On all dates the value of the portfolio is equal to:

$$V_t = M_t - N_{old} P_t$$

where $M_t$ is the value of the money market component of the portfolio at the close of date t, $N_{old}$ is the number of put options sold at the previous roll date, and $P_t$ is the arithmetic average of last bid and ask prices of the put option reported before 4:00 p.m. ET on date t.

On all but roll dates, the value of the money market account is equal to:

$$M_t = (1 + \rho_{t-1,t}) M_{t-1}$$

where $\rho_{t-1,t}$ is the LIBOR rate from date t−1 to date t.

On roll dates, the value of the money market account includes the cash settlement from the expiring put options and the proceeds from the sale of new put options:

$$M_t = (1 + \rho_{t-1,t}) M_{t-1} - N_{old} \text{Max}[0, K_{old} - SOQ_t] + N_{new} P_{vwap}$$

where $K_{old}$ is the strike price of the put options sold at the previous roll date, $SOQ_t$ is the final settlement price of these options on roll date t, $N_{new}$ is the number of new puts sold and $P_{vwap}$ is the volume-weighted average price at which these options are sold. The number $N_{new}$ of new puts sold on roll date t is determined as follows:

$$N_{new} = (M_{t-1}(1+\rho_{t-1,t}) - N_{t-1} \text{max}[0, K_{old} - SOQ_t])/(K_{new}/(1+r) - P_{vwap})$$

where $K_{new}$ is the strike price at which the new puts are sold, and r is the effective LIBOR rate of return from this to the next roll date. Compounding the rate $\rho_{t-1,t}$ daily from roll date t to the next roll date yields the effective rate r.

TABLE 1

|  |  |  | 1+ Daily Rate of Interest | Cash Account | Strike Price | Settlement Price | Puts in Portfolio | Roll Bid | Average Close Bid/Ask | Portfolio Value at Close |
|---|---|---|---|---|---|---|---|---|---|---|
| Reg Date | 17-Feb |  |  | 791.38 |  |  | 0.6736 |  |  |  |
| Roll Date | 18-Feb | Pre Settle | 1.000072 | 791.44 | 1175.00 | 1200.85 |  |  |  |  |
|  |  | Post Settle |  | 791.44 |  |  |  |  |  |  |
|  |  | Post Settle Of Puts |  | 799.52 | 1200.00 |  | 0.6676 | 12.10 | 11.45 | 791.87 |
| Reg Date | 22-Feb |  |  | 799.75 |  |  | 0.6676 |  | 22.05 | 785.02 |

* 1+ Compound Rate of Interest to next roll is 1.002022

Table 1 illustrates the calculation of the collateralized short at-the-money put index on Feb. 18, 2005, a roll date, and on Feb. 22, 2005, a regular date.

The cash column follows the cash in the money market account that is reinvested at the daily rate of 0.000072. This is the rate which is compounded daily to the next roll date and returns the effective rate of return on a LIBOR investment based on one-month LIBOR rates quoted on the roll date (28 days to expiration, 1.000072^28=1.00202174, truncated to 1.002022).

On Friday, Feb. 18, 2005, prior to settlement of the expiring put, the cash in the money market account is 791.43 (=791.38*1.00072). The puts settle out-of-the-money, thus there is no debit from final settlement and the post settle amount is therefore 791.43. Then 0.6676 new puts are sold at bid price of 12.10, so the money market account increases to 799.51. At the close, the value of the portfolio is the value of the money market account less the mark to market of the new puts at the average of the closing Bid/Ask, or 791.87. (Prior to Nov. 20, 1992, no mark to market at the roll date; only on the following date, as puts were settled at the close prior to this date, so new puts would have been sold at the close).

The next business day is Monday Feb. 22, 2005. The money market account has accumulated 4 days of interest and is now 799.74=799.51*1.000072^4. The portfolio value at the close is 785.02, which is the value of money market account less the mark to market of the puts at the average bid/ask of 22.05

The number N of puts to sell on a roll date is set such that the cash account at the next roll date will be sufficient to cover the worst settlement loss. The new strike on February 18 is 1200, so the worst settlement payout will be N*1200. The cash available at the next roll will be the value of the money market post settlement on February 18 plus value of the N puts sold, all reinvested at the LIBOR rate to the next roll. Solving this equation yields the number of puts to sell.

The same algorithm is used to calculate the indexes of other collateralized strategies.

Collateralized Short S&P 500 Bear Spread Indexes

In another embodiment, CBOE Collateralized Short S&P 500 Bear Spread Indexes measure the performance of another option strategy based on CBOE S&P 500 options. This strategy, called the "Collateralized Short Bear Spread Strategy," consists of holding a hypothetical portfolio of (1) a money market account invested at one-month LIBOR and (2) a sequence of short positions in one-month CBOE S&P 500 bear spreads, that is short an at-the-money put and long an out-of-the money put. The monthly process of settling the expiring options, selling new options and reinvesting the amount in the money market account at LIBOR is referred to as the "roll" and described in detail below.

Each Collateralized Short Bear Spread Index represents the value of an initial investment of $100 in the Collateralized Short Bear Spread strategy. On Jun. 1, 1988, the inception date of the index, $100 is invested at one-month LIBOR. Following this inception date, and starting on Jun. 17, 1988, one-month S&P 500 bear spreads are sold at each S&P 500 option expiration date.

The at-the-money and out-of-the-money put options are held to the next expiration, usually the 3$^{rd}$ Friday of the month when they are settled to the Special Opening Quotation (or SOQ, ticker "SET") of the S&P 500. If the third Friday is an exchange holiday, the put option will be settled against the SOQ on the previous business day and the new put option will be selected on that day as well. The SOQ is a special calculation of the S&P 500 Index that is compiled from the opening prices of component stocks underlying the S&P 500 Index. The SOQ calculation is performed when all 500 stocks underlying the S&P 500 Index have opened for trading, and is usually determined before 11:00 a.m. ET. If one or more stocks in the S&P 500 Index do not open on the day the SOQ is calculated, the final settlement price for SPX options is determined in accordance with the Rules and By-Laws of the OCC. The final settlement price of the expiring put option is the greater of 0 and the difference between its strike price and the SOQ.

After the settlement of the expiring put options, new at-the-money and out-of the money put options expiring in the next month are sold and bought respectively. The strike price of the new at-the-money put option is the strike price of the listed CBOE S&P 500 Index put option that is closest to but not greater than the last value of the S&P 500 Index reported before 11:00 a.m. ET. The strike price of the new 5% out-of-the-money put option bought is the strike price of the listed CBOE S&P 500 Index put options that is closest to but not greater than 0.95 times the last value of the S&P 500 Index reported before 11:00 a.m. ET. For example, if the last S&P 500 Index value reported before 11:00 a.m. ET is 1233.10 and the closest listed S&P 500 Index put option strike price below 1233.10 is 1230 then 1230 strike S&P 500 Index put options are sold. If the out-of-the-money put is selected to be 5% out-of-the money, for example, and if the 1170 strike put option is the closest listed strike below 1171.45, then the 1170 strike out-of-the-money put options would be bought.

Once the next strike prices have been identified, new at-the-money and out-of-the-money put options are deemed sold and bought respectively at prices equal to the volume-weighted averages of the traded prices ("VWAP") of the put options with the same strikes during the half-hour period beginning at 11:30 a.m. ET. The CBOE calculates the VWAP in a two-step process: first, the CBOE excludes trades between 11:30 a.m. and 12:00 p.m. ET that are identified as having been executed as part of a "spread", and then the CBOE calculates the weighted average of all remaining transaction prices at that strike between 11:30 a.m. and 12:00 p.m. ET, with weights equal to the fraction of total non-spread volume transacted at each price during this period. The source of the transaction prices used in the calculation of the VWAP is CBOE's Market Data Retrieval ("MDR") System. Time and sales information from CBOE's MDR System is disseminated through the OPRA and is publicly available through most price quote vendors. If no transactions occur at the new put strike between 11:30 a.m. and 12:00 p.m. ET, then the new put options are deemed sold at the last bid price reported before 12:00 p.m. ET.

The number of put bear spreads sold collateralizes the portfolio; it is set such that the value of the money market account at the next roll date will equal the greatest potential loss from the final settlement of the expiring options. Last, the cash flows from the final settlement of expiring options and the sale of options are debited and credited respectively from and to the money market account, and the amount in the account is then reinvested at one-month LIBOR. It can be assumes that the intraday cash flows from the final settlement of the options to the SOQ at the open and the subsequent sale of new puts are invested at the close of the roll date.

EXAMPLE 3

Index Calculation

CBOE Collateralized Short Bear Spread Indexes are preferably calculated by the CBOE once per day at the close of trading (for the respective components of the collateralized short S&P 500 put portfolio), but may be calculated more or less frequently. On any given date, each index represents the value of the portfolio invested in the Collateralized Short S&P 500 strategy since the inception date of the Index.

On all dates the value of the portfolio is equal to:

$$V_t = M_t - N_{old} P_t$$

where $M_t$ is the value of the money market component of the portfolio at the close of date t, $N_{old}$ is the number of bear spreads sold at the previous roll date, and $P_t$ is the difference between the arithmetic averages of the last bid and ask prices of the at-the-money and out-of-the-money put options reported before 4:00 p.m. ET on date t.

On all but roll dates, the value of the money market account is equal to:

$$M_t = (1 + \rho_{t-1,t}) M_{t-1}$$

where $\rho_{t-1,t}$ is the LIBOR rate from date t−1 to date t.

On roll dates, the value of the money market account includes the cash settlement from the expiring put options and the proceeds from the sale of new bear spreads:

$$M_t = (1+\rho_{t-1,t})M_{t-1} - N_{old}(\text{Max}[0, K_{old}^{atm} - SOQ_t] - \text{Max}[0, K_{old}^{otm} - SOQ_t]) + N_{new} P_{vwap}$$

where $K_{old}$ is the strike price of the put options sold at the previous roll date, $SOQ_t$ is the final settlement price of these options on roll date t, $N_{new}$ is the number of new bear spreads sold and $P_{vwap}$ is the price of the spread based on the volume-weighted average prices at which the at-the-money and out-of-the money put options in the spread are sold and bought respectively. The number $N_{new}$ of new bear spreads sold on roll date t is determined as follows:

$$N_{new} = (M_{t-1}(1+\rho_{t-1,t}) - N_{t-1}(\max[0, K_{old}^{atm} - SOQ_t] - \max[0, K_{old}^{otm} - SOQ_t])) / ((K_{new}^{atm} - K_{new}^{otm})/(1+r) - P_{vwap})$$

where $K^{atm}_{new}$ and $K^{otm}_{new}$ are the strike prices at which the new puts are sold and bought respectively, and r is the effective LIBOR rate of return from this to the next roll date.

Compounding the rate $\rho_{t-1,t}$ daily from roll date t to the next roll date yields the effective rate r.

The package of options that are traded varies from strategy to strategy. For example, for a short bull spread with strikes at-the-money (ATM) and 5% out-of-the-money (OTM), you sell N ATM calls and buy N 5% OTM calls. The worst settlement loss in that case is N (OTM strike-ATM strike). This is what is used to determine how many spreads to sell. The short bear spread is analogous, but uses puts. For the ATM straddle truncated at 5% you sell N ATM puts, N ATM calls and you buy N 5% OTM calls. In such a scenario, the worst loss at final settlement is the maximum of the ATM put strike and the difference between the OTM call strike and the ATM call strike.

In another embodiment, CBOE Collateralized Short S&P 500 Bear Spread Indexes measure the performance of an option strategy based on CBOE S&P 500 options. This strategy, called the "Collateralized Short Bear Spread Strategy," consists of holding a hypothetical portfolio of (1) a money market account invested at one-month LIBOR and (2) a sequence of short positions in one-month CBOE S&P 500 bear spreads, for example, short at-the-money puts and long 5% out-of-the money puts. The monthly process of settling the expiring options, selling new options and reinvesting the amount in the money market account at LIBOR is referred to as the "roll" and described in detail below.

Each Collateralized Short Bear Spread Index represents the value of an initial investment of $100 in the Collateralized Short Bear Spread strategy. On Jun. 1, 1988, the inception date of the index, $100 is invested at one-month LIBOR. Following this inception date, and starting on Jun. 17, 1988, one-month S&P 500 bear spreads are sold at each S&P 500 option expiration date.

The at-the-money and out-of-the-money put options are held to the next expiration, usually the $3^{rd}$ Friday of the month when they are settled to the Special Opening Quotation (or SOQ, ticker "SET") of the S&P 500. If the third Friday is an exchange holiday, the put option will be settled against the SOQ on the previous business day and the new put option will be selected on that day as well The SOQ is a special calculation of the S&P 500 Index that is compiled from the opening prices of component stocks underlying the S&P 500 Index. The SOQ calculation is performed when all 500 stocks underlying the S&P 500 Index have opened for trading, and is usually determined before 11:00 a.m. ET. If one or more stocks in the S&P 500 Index do not open on the day the SOQ is calculated, the final settlement price for SPX options is determined in accordance with the Rules and By-Laws of the OCC. The final settlement price of the expiring put option is the greater of 0 and the difference between its strike price and the SOQ.

After the settlement of the expiring put options, new at-the-money and out-of the money put options expiring in the next month are sold and bought respectively. The strike price of the new at-the-money put option is the strike price of the listed CBOE S&P 500 Index put option that is closest to but not greater than the last value of the S&P 500 Index reported before 11:00 a.m. ET. The strike price of the new 5% out-of-the-money put option bought is the strike price of the listed CBOE S&P 500 Index put options that is closest to but not greater than 0.95 times the last value of the S&P 500 Index reported before 11:00 a.m. ET. For example, if the last S&P 500 Index value reported before 11:00 a.m. ET is 1233.10 and the closest listed S&P 500 Index put option strike price below 1233.10 is 1230 then 1230 strike S&P 500 Index put options are sold. If the out-of-the-money put is selected to be 5% out-of-the money, for example, and if the 1170 strike put option is the closest listed strike below 1171.45, then the 1170 strike out-of-the-money put options would be bought.

Once the next strike prices have been identified, new at-the-money and out-of-the-money put options are deemed sold and bought respectively at prices equal to the volume-weighted averages of the traded prices ("VWAP") of the put options with the same strikes during the half-hour period beginning at 11:30 a.m. ET. The CBOE calculates the VWAP in a two-step process: first, the CBOE excludes trades between 11:30 a.m. and 12:00 p.m. ET that are identified as having been executed as part of a "spread", and then the CBOE calculates the weighted average of all remaining transaction prices at that strike between 11:30 a.m. and 12:00 p.m. ET, with weights equal to the fraction of total non-spread volume transacted at each price during this period. The source of the transaction prices used in the calculation of the VWAP is CBOE's Market Data Retrieval ("MDR") System. Time and sales information from CBOE's MDR System is disseminated through the OPRA and is publicly available through most price quote vendors If no transactions occur at the new put strike between 11:30 a.m. and 12:00 p.m. ET, then the new put options are deemed sold at the last bid price reported before 12:00 p.m. ET.

The number of put bear spreads sold collateralizes the portfolio; it is set such that the value of the money market account at the next roll date will equal the greatest potential loss from the final settlement of the expiring options. Last, the cash flows from the final settlement of expiring options and the sale of options are debited and credited respectively from and to the money market account, and the amount in the account is then reinvested at one-month LIBOR. It can be assumes that the intraday cash flows from the final settlement of the options to the SOQ at the open and the subsequent sale of new puts are invested at the close of the roll date.

Figure 2:
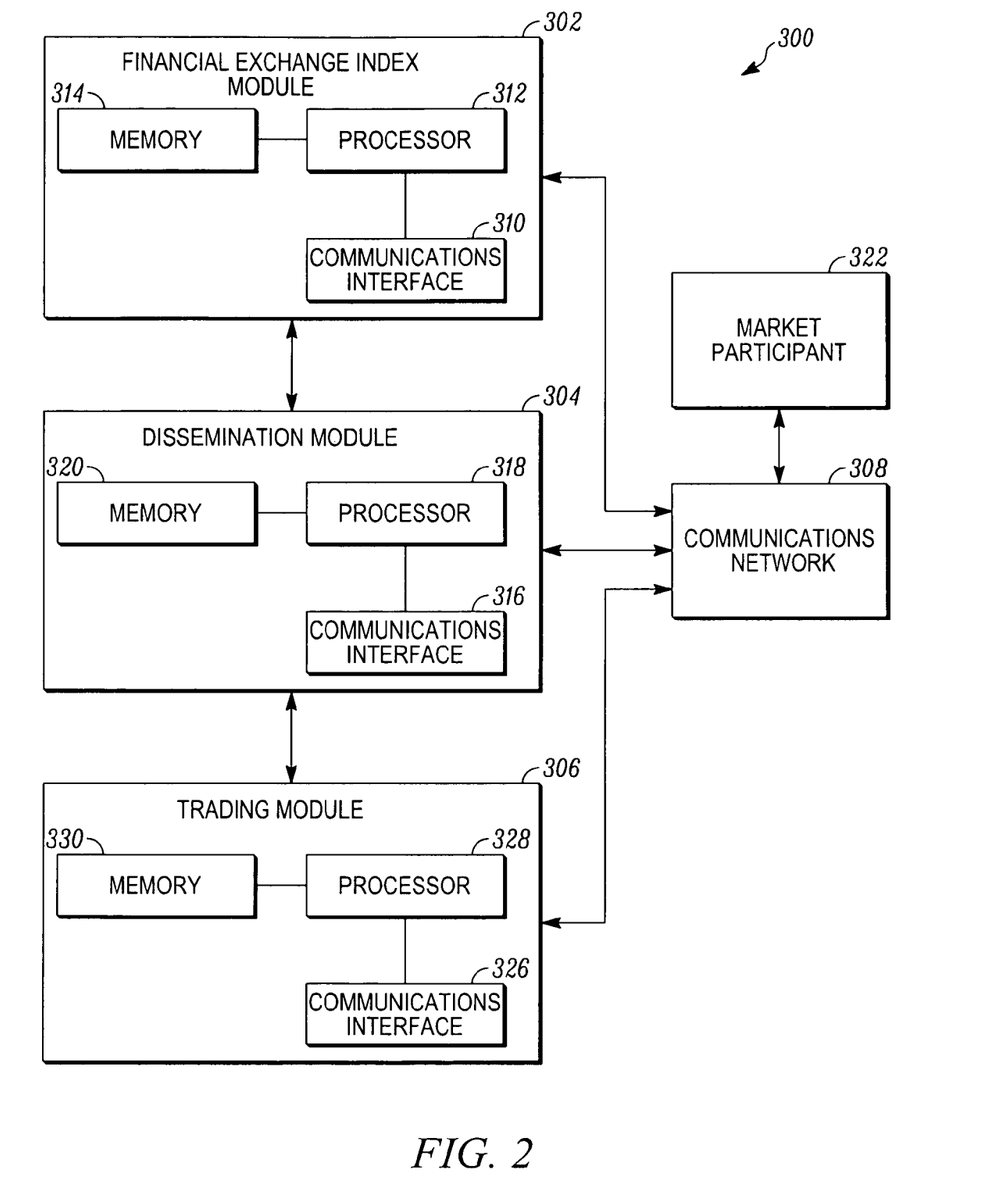
FIG. 2 is a block diagram of a system for creating and trading derivative investment instruments based on an index of financial exchanges.

FIG. 2 is a block diagram of one embodiment of a system 300 for creating and trading derivative investment instruments based on an index of collateralized options. Generally, the system comprises a financial exchange index module 302, a dissemination module 304 coupled with the financial exchange index module 302, and a trading module 306 coupled with the dissemination module 304. Typically, each module 302, 304, 306 is also coupled to a communication network 308 coupled to various trading facilities 322 and liquidity providers 324.

The financial exchange index module 302 comprises a communications interface 310, a processor 312 coupled with the communications interface 310, and a memory 314 coupled with the processor 312. Logic stored in the memory 314 is executed by the processor 312 such that that the financial exchange index module 302 may receive a first set of trade information for each security representative of a desired group of securities and futures exchanges through the communications interface 310, aggregate that first set of trade information over a first time period, calculate an index for the desired group of exchanges with the aggregated first set of trade information, and a standardized measure of the index, as described above; and pass the calculated values to the dissemination module 304.

The dissemination module 304 comprises a communications interface 316, a processor 318 coupled with the communications interface 316, and a memory 320 coupled with the processor 318. Logic stored in the memory 320 is executed by the processor 318 such that the dissemination module 304 may receive the calculated values from the financial exchange index module 302 through the communications interface 316, and disseminate the calculated values over the communications network 308 to various market participants 322.

The trading module 306 comprises a communications interface 326, a processor 328 coupled with the communications interface 326, and a memory 330 coupled with the processor 328. Logic stored in the memory 330 is executed by the processor 328 such that the trading module 306 may receive buy or sell orders over the communications network 308, as described above, and pass the results of the buy or sell order to the dissemination module 304 to be disseminated over the communications network 308 to the market participants 322.

Figure 3:
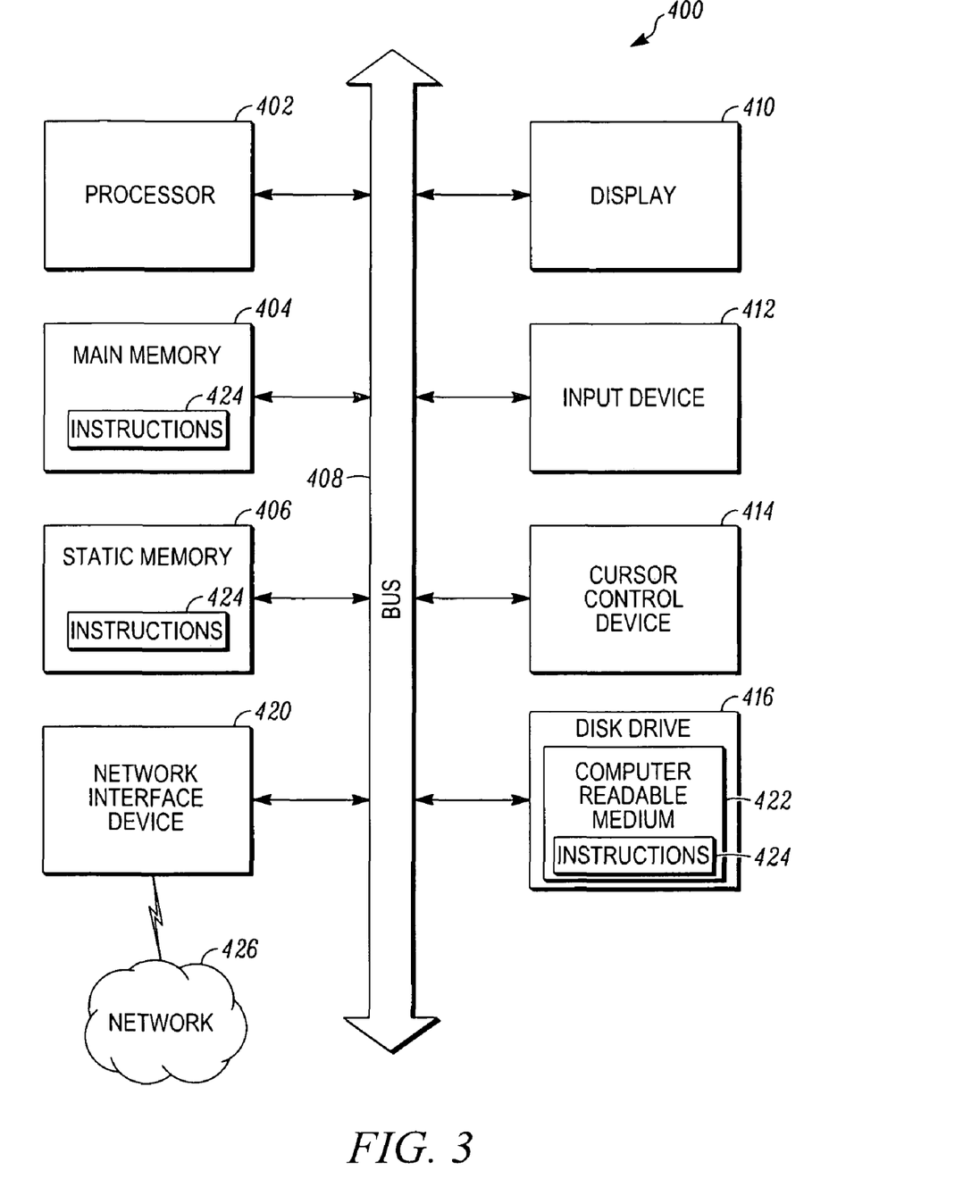
FIG. 3 is a block diagram of a general computing device and network connectivity.

Referring to FIG. 3, an illustrative embodiment of a general computer system that may be used for one or more of the components shown in FIG. 2, or in any other trading system configured to carry out the methods discussed above, is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 3, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 3, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used on financial exchanges, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As will be appreciated by those of ordinary skill in the art, mechanisms for creating a stock index for a predetermined group of securities and futures exchanges, derivative investment instruments based thereon and other features described above may all be modified for application to other derivative investment instruments, such as futures, within the purview and scope of the present invention. An advantage of the disclosed methods and derivative investment instruments is that more traders at the exchange may have more opportunity to trade new products and obtain new and valuable market information, thus increasing visibility of orders and the desirability of maintaining a presence at the exchange.

Examples collateralized derivative investment instruments created by the methods disclosed above may include a derivative contract based on an underlying collateralized option index that calculates a value of a portfolio invested in a collateralized short strategy according to the relation:

$$V_t = M_t - N_{old} P_t$$

where $M_t$ is a value of a LIBOR component of the portfolio at the close of date t, $N_{old}$ is a number of put options sold at a last roll date, and $P_t$ is the arithmetic average of last bid and ask prices of the put option reported before a time on date t. Alternatively, $M_t$ may be the value of a money market component of the portfolio at the close of date t.

A collateralized derivative investment instrument may also include a derivative contract based on an underlying collateralized option index that calculates a value of a portfolio invested in a collateralized short strategy according to the above relation where $M_t$ is a value of a money market component of the portfolio at a close of date t, $N_{last}$ is a number of bear spreads sold at a previous roll date, and $P_t$ is a value of the bear spread at a close, equal to a difference between arithmetic averages of last bid and ask prices of at-the-money and out-of-the-money put options reported before a time on date t.

The matter set forth in the foregoing description, accompanying drawings and claims is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention.

What is claimed is:

1. A computer-readable memory containing processor executable program instructions for creating a collateralized option index according to the following steps:
    calculating a value of a portfolio invested in a collateralized short strategy according to a relation:

$$V_t = M_t - N_{old} P_t$$

wherein $M_t$ is a value of a LIBOR component of the portfolio at a close of date t, $N_{old}$ is a number of put options sold at a last roll date, and $P_t$ is a price of an underlying option portfolio based on arithmetic averages of last bid and ask prices of all options in the underlying option portfolio reported before a time on date t.

2. The computer-readable memory according to claim 1, wherein on dates other than roll dates a value of the LIBOR component is equal to:

$$M_t = (1 + \rho_{t-1,t}) M_{t-1}$$

wherein $\rho_{t-1,t}$ is an effective LIBOR rate from date t−1 to date t.

3. The computer-readable memory according to claim 2, wherein on roll dates cash outflow from a final settlement of expiring options is debited from an account and proceeds from sales of new put options is credited to the account according to a relation:

$$M_t = (1 + \rho_{t-1,t}) M_{t-1} - N_{old} \mathrm{Max}[0, K_{old} - SOQ_t] + N_{new} P_{vwap}$$

where $K_{old}$ is a strike price of put options sold at a previous roll date, $SOQ_t$ is a final settlement price of these options on date t, $N_{new}$ is a number of new puts sold and $P_{vwap}$ is a volume-weighted average price at which the new options are sold.

4. The computer-readable memory according to claim 3, wherein the number $N_{new}$ is determined according to a relation:

$$N_{new} = (M_{t-1}(1+\rho_{t-1,t}) - N_{t-1} \max[0, K_{old} - SOQ_t]) / (K_{new} / (1+r) - P_{vwap})$$

wherein $K_{new}$ is a strike price at which new puts are sold, and r is an effective LIBOR rate of return from a present roll date to a next roll date; and
wherein r results from compounding the rate $\rho_{t-1,t}$ daily from roll date t to the next roll date.

5. A computer-readable memory containing processor executable program instructions for creating a collateralized option index according to the following steps:
    calculating a value ($V_t$) of a portfolio invested in a collateralized short strategy according to a relation:

$$V_t = M_t - N_{old} P_t$$

wherein $M_t$ is a value of a money market component of the portfolio at a close of date t, $N_{old}$ is a number of put options sold at a previous roll date, and $P_t$ is a price of an underlying option portfolio based on arithmetic averages of last bid and ask prices of all options in the underlying option portfolio reported before a time on date t.

6. The computer-readable memory according to claim 5, wherein on dates other than roll dates the value of a LIBOR component is equal to:

$$M_t = (1 + \rho_{t-1,t}) M_{t-1}$$

wherein $\rho_{t-1,t}$ is an effective LIBOR rate from date t−1 to date t.

7. The computer-readable memory according to claim 5, wherein on roll dates a value of a money market account includes a cash settlement from expiring put options and proceeds from sales of new put options according to a relation:

$$M_t = (1 + \rho_{t-1,t}) M_{t-1} - N_{old} \mathrm{Max}[0, K_{old} - SOQ_t] + N_{new} P_{vwap}$$

where $K_{old}$ is a strike price of the put options sold at the previous roll date, $SOQ_t$ is the final settlement price of these options on roll date t, $N_{new}$ is a number of new puts sold and $P_{vwap}$ is a volume-weighted average price at which these options are sold.

8. The computer-readable memory according to claim 7, wherein the number Nnew is determined according to a relation:

$$N_{new}=(M_{t-1}(1+\rho_{t-1,t})-N_{t-1}\max[0,K_{old}-SOQ_t])/(K_{new}/(1+r)-P_{vwap})$$

wherein $K_{new}$ is a strike price at which new puts are sold, and r is an effective LIBOR rate of return from a present roll date to a next roll date; and wherein r results from compounding the rate $\rho_{t-1,t}$ daily from roll date t to the next roll date.

9. A computer-readable memory containing processor executable program instructions for creating a collateralized option index according to the following steps:

calculating a value (Vt) of a portfolio invested in a collateralized short strategy according to a relation:

$$V_t=M_t-N_{old}P_t$$

wherein $M_t$ is a value of a money market component of the portfolio at a close of date t, $N_{old}$ is a number of bear spreads sold at a previous roll date, and $P_t$ is a value of the bear spread at the close, equal to a difference between arithmetic averages of last bid and ask prices of at-the-money and out-of-the-money put options reported before a time on date t.

10. The computer-readable memory according to claim 9, wherein on dates other than roll dates a value of a LIBOR component is equal to:

$$M_t=(1+\rho_{t-1,t})M_{t-1}$$

wherein $\rho_{t-1,t}$ is an effective LIBOR rate from date t−1 to date t.

11. The computer-readable memory according to claim 10, wherein on roll dates a value of a money market account includes a cash settlement from an expiring put options and proceeds from a sale of new bear spreads according to a relation:

$$N_{new}=(M_{t-1}(1+\rho_{t-1,t})-N_{t-1}(\max[0,K_{old}^{atm}-SOQ_t]-\max[0,k_{old}^{otm}-SOQ_t])/((K_{new}^{atm}-K_{new}^{otm})/(1+r)-P_{vwap})$$

wherein $K_{new}^{atm}$ and $K_{new}^{otm}$ are strike prices at which the new puts are sold and bought respectively; and wherein r is the effective LIBOR rate of return from roll date t to the next roll date.

12. The computer-readable memory according to claim 11, wherein the number $N_{new}$ is determined according to a relation:

$$N_{new}=(M_{t-1}(1+\rho_{t-1,t})-N_{t-1}\max[0,K_{old}-SOQ_t])/(K_{new}/(1+r)-P_{vwap})$$

wherein $K_{new}$ is a strike price at which new puts are sold, and r is an effective LIBOR rate of return from a present roll date to a next roll date; and wherein r results from compounding the rate $\rho_{t-1,t}$ daily from roll date t to the next roll date.

13. A computer system for calculating a collateralized option index, the computer system comprising:

a processor configured to determine a value ($V_t$) of a portfolio invested in a collateralized short strategy according to a relation:

$$V_t=M_t-N_{old}P_t$$

wherein $M_t$ is a value of a LIBOR component of the portfolio at a close of date t, $N_{old}$ is a number of put options sold at a last roll date, and $P_t$ is a price of an underlying option portfolio based on arithmetic averages of last bid and ask prices of all options in the underlying option portfolio reported before a time on date t; and a communications interface configured to transmit the value of the portfolio in the collateralized short strategy to market participants over a communication network.

14. The computer system according to claim 13, wherein on dates other than roll dates the value of the LIBOR component is equal to:

$$M_t=(1+\rho_{t-1,t})M_{t-1}$$

wherein $\rho_{t-1,t}$ is an effective LIBOR rate from date t−1 to date t.

15. The computer system according to claim 14, wherein on roll dates, cash outflow from a final settlement of expiring options is debited from an account and proceeds from sales of new put options is credited to the account according to a relation:

$$M_t=(1+\rho_{t-1,t})M_{t-1}-N_{old}\text{Max}[0,K_{old}-SOQ_t]+N_{new}P_{vwap}$$

wherein $K_{old}$ is a strike price of put options sold at a previous roll date, $SOQ_t$ is a final settlement price of these options on date t, $N_{new}$ is a number of new puts sold and $P_{vwap}$ is a volume-weighted average price at which the new options are sold.

16. The computer system according to claim 15, wherein the number Nnew is determined according to a relation:

$$N_{new}=(M_{t-1}(1+\rho_{t-1,t})-N_{t-1}\max[0,K_{old}-SOQ_t])/(K_{new}/(1+r)-P_{vwap})$$

wherein $K_{new}$ is a strike price at which new puts are sold, and r is an effective LIBOR rate of return from a present roll date to a next roll date; and wherein r results from compounding the rate $\rho_{t-1,t}$ daily from roll date t to the next roll date.

17. A computer system for calculating a collateralized option index, the computer system comprising:

a processor configured to calculate a value (Vt) of a portfolio invested in a collateralized short strategy according to a relation:

$$V_t=M_t-N_{old}P_t$$

wherein $M_t$ is a value of a money market component of the portfolio at a close of date t, $N_{old}$ is a number of put options sold at a previous roll date, and $P_t$ is a difference between arithmetic averages of a last bid and ask prices of the put option reported before a time on date t; and a communications interface configured to transmit the value of the portfolio to market participants over a communication network.

18. The computer system according to claim 17, wherein on dates other than roll dates the value of a LIBOR component is equal to:

$$M_t=(1+\rho_{t-1,t})M_{t-1}$$

wherein $\rho_{t-1,t}$ is an effective LIBOR rate from date t−1 to date t.

19. The computer system according to claim 18, wherein on roll dates a value of a money market account includes a cash settlement from expiring put options and proceeds from sales of new put options according to a relation:

$$M_t=(1+\rho_{t-1,t})M_{t-1}-N_{old}\text{Max}[0,K_{old}-SOQ_t]+N_{new}P_{vwap}$$

wherein $K_{old}$ is a strike price of the put options sold at the previous roll date, $SOQ_t$ is a final settlement price of these options on roll date t, $N_{new}$ is a number of new puts sold and $P_{vwap}$ is a volume-weighted average price at which these options are sold.

20. The computer system according to claim 19, wherein the number $N_{new}$ is determined according to a relation:

$$N_{new}=(M_{t-1}(1+\rho_{t-1,t})-N_{t-1}\max[0,K_{old}-SOQ_t])/(K_{new}/(1+r)-P_{vwap})$$

wherein $K_{new}$ is a strike price at which new puts are sold, and r is an effective LIBOR rate of return from a present roll date to a next roll date; and wherein r results from compounding the rate $\rho_{t-1,t}$ daily from roll date t to the next roll date.

21. A computer system for calculating a collateralized option index, the computer system comprising:

a processor configured to calculate a value of a portfolio invested in a collateralized short strategy according to a relation:

$$V_t=M_t-N_{old}P_t$$

wherein $M_t$ is a value of a money market component of the portfolio at a close of date t, $N_{old}$ is a number of bear spreads sold at a previous roll date, and $P_t$ is a value of the bear spread at a close, equal to a difference between arithmetic averages of last bid and ask prices of at-the-money and out-of-the-money put options reported before a time on date t; and a communications interface configured to transmit the value of the portfolio to market participants over a communication network.

22. The computer system according to claim 21, wherein on dates other than roll dates a value ($M_t$) of a LIBOR component is equal to:

$$M_t=(1+\rho_{t-1,t})M_{t-1}$$

wherein $\rho_{t-1,t}$ is an effective LIBOR rate from date t−1 to date t.

23. The computer system according to claim 22, wherein on roll dates a value of a money market account includes a cash settlement from expiring put options and proceeds from a sale of new bear spreads according to a relation:

$$M_t=(1+\rho_{t-1,t})M_{t-1}-N_{old}\text{Max}[0,K_{old}^{atm}-SOQ_t]+N_{new}P_{vwap}$$

wherein $K_{old}^{atm}$ is a strike price of the put options sold at the previous roll date, $SOQ_t$ is a final settlement price of these options on roll date t, $N_{new}$ is the number of new bear spreads sold and $P_{vwap}$ is a price of the spread based on a volume-weighted average prices at which at-the-money and out-of-the money put options in the spread are sold and bought respectively.

24. The computer system according to claim 23, wherein $N_{new}$ is a number of new bear spreads sold on roll date t according to a relation:

$$N_{new}=(M_{t-1}(1+\rho_{t-1,t})-N_{t-1}(\max[0,K_{old}^{atm}-SOQ_t]-\max[0,K_{old}^{atm}-SOQ_t])/((K_{new}^{atm}-K_{new}^{otm})/(1+r)-P_{vwap})$$

wherein $K_{new}^{atm}$ and $K_{new}^{otm}$ are strike prices at which the new puts are sold and bought respectively; and wherein r is the effective LIBOR rate of return from roll date t to the next roll date.

* * * * *

UNITED STATES PATENT AND TRADEMARK OFFICE
CERTIFICATE OF CORRECTION

PATENT NO. : 7,949,586 B2      Page 1 of 1
APPLICATION NO. : 12/020809
DATED : May 24, 2011
INVENTOR(S) : Catherine T. Shalen It is certified that error appears in the above-identified patent and that said Letters Patent is hereby corrected as shown below:

In the Claims

In column 22, claim 24, line 23, replace "max[0, $K_{old}^{atm}$-$SOQ_t$])/(($K_{new}$" with --max[0, $K_{old}^{otm}$-$SOQ_t$])/(($K_{new}$--.

Signed and Sealed this
Sixteenth Day of August, 2011

David J. Kappos
*Director of the United States Patent and Trademark Office*